(12) United States Patent
Sasaki (10) Patent No.: US 7,407,018 B2
(45) Date of Patent: Aug. 5, 2008

(54) POWER WORKING MACHINE

(75) Inventor: Hideshi Sasaki, Wako (JP)

(73) Assignee: Honda Motor Co., Ltd. (JP)

( * ) Notice: Subject to any disclaimer, the term of this patent is extended or adjusted under 35 U.S.C. 154(b) by 0 days.

(21) Appl. No.: 11/061,494

(22) Filed: Feb. 18, 2005

(65) Prior Publication Data

US 2005/0204568 A1 Sep. 22, 2005

(30) Foreign Application Priority Data

Mar. 22, 2004 (JP) .............................. 2004-083067

(51) Int. Cl.
*B27B 19/02* (2006.01)
(52) U.S. Cl. .................... 173/170; 173/216; 30/519; 30/210; 30/383
(58) Field of Classification Search ............. 30/210, 30/216, 382, 383, 519, 211, 518; 83/837, 83/DIG. 1; 16/110, 426, 900, 110.1; 451/516, 451/525; 173/170, 216; 200/321, 322, 334, 200/43.17, 43.16, 43.19; 56/DIG. 18
See application file for complete search history.

(56) References Cited

U.S. PATENT DOCUMENTS

| | | | | |
|---|---|---|---|---|
| 2,422,755 A | * | 6/1947 | Strother ................... | 192/129 A |
| 4,399,340 A | * | 8/1983 | Crandall et al. ............. | 200/334 |
| 4,785,540 A | * | 11/1988 | Arvidsson ................... | 30/520 |
| 5,065,476 A | * | 11/1991 | Dohse et al. ................... | 16/426 |
| 5,161,679 A | * | 11/1992 | Russo ..................... | 200/43.17 |
| 5,212,886 A | * | 5/1993 | Tasaki ........................ | 30/381 |
| 5,466,183 A | * | 11/1995 | Kirn et al. ................... | 451/359 |
| 5,681,214 A | * | 10/1997 | Kleider et al. .............. | 451/358 |
| 6,548,776 B1 | * | 4/2003 | Jong .......................... | 200/334 |
| 6,973,726 B2 | * | 12/2005 | Kramer ...................... | 30/216 |
| 2003/0101600 A1 | * | 6/2003 | James et al. .................. | 30/392 |
| 2005/0115079 A1 | * | 6/2005 | Sasaki et al. .................. | 30/210 |
| 2005/0115340 A1 | * | 6/2005 | Sasaki et al. .................... | 74/25 |

FOREIGN PATENT DOCUMENTS

JP 11028683 2/1999

* cited by examiner

*Primary Examiner*—Boyer D. Ashley
*Assistant Examiner*—Laura M. Lee
(74) *Attorney, Agent, or Firm*—Adams & Wilks (57) ABSTRACT

A hedge trimmer is provided which performs a trimming operation on a hedge. The hedge trimmer includes a machine body, a handle rotatably attached to the machine body, a throttle lever provided in the handle, a locking mechanism for preventing the handle from rotating relative to the machine body, and an unlocking member for unlocking the locking mechanism from the machine body. The unlocking of the locking mechanism from the machine body is effected by a slide movement of the unlocking member towards a rear part of the handle. When unlocking the locking mechanism from the machine body, the unlocking member surrounds the throttle lever so that the throttle lever can be inoperable with the result that the throttle lever is prevented from being erroneously operated during the rotational operation of the handle.

5 Claims, 11 Drawing Sheets

POWER WORKING MACHINE

FIELD OF THE INVENTION

The present invention relates to a power working machine including a handle rotatable to a position suitable for trimming an upper or side surface of a hedge with improved workability.

BACKGROUND OF THE INVENTION

The above type of the working machine includes a machine body, a handle rotatably attached to the machine body, a throttle lever provided in the handle for adjusting a motive power output from the working machine, and a throttle lock lever for locking the throttle lever.

For practical use, it is only necessary that the power working machine include, as well as the throttle lever and the throttle lock lever, a locking mechanism provided in the machine body for locking the handle to stop rotation of the handle and an unlocking lever provided in the machine body for unlocking the locking mechanism.

The locking mechanism is operable together with a throttle wire, and the power working machine including such a locking mechanism is well known from, for example, JP-A-11-28683. The power working machine disclosed in JP-A-11-28683 will be discussed with reference to FIG. 12 hereof.

Figure 12:
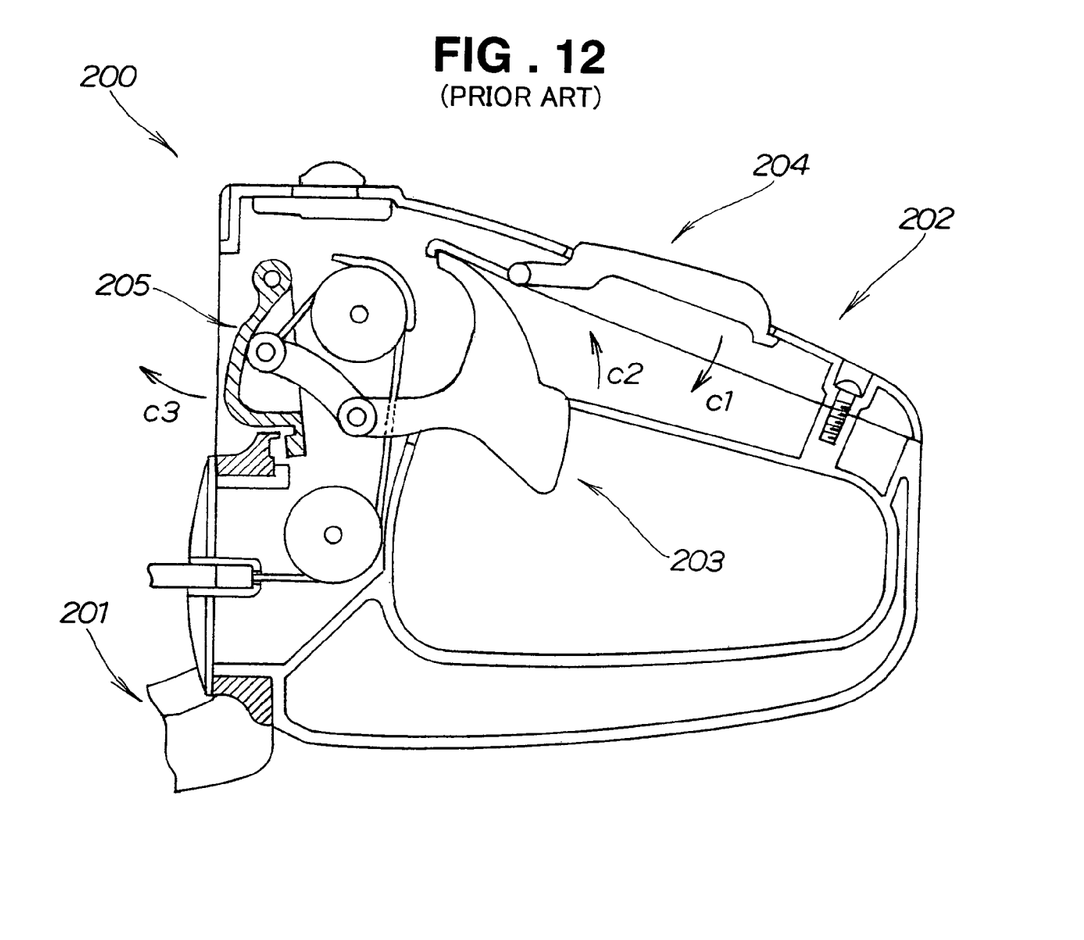
FIG. 12 is a schematic view of a handle apparatus of a conventional power working machine.

The disclosed, conventional power working machine designated at 200 includes a machine body 201, a handle 202 rotatably attached to the machine body 201, a throttle lever 203 swingably attached to the handle 202, a throttle lock lever 204 for locking the throttle lever 203, and a locking member 205 disposed to be pushed towards the machine body 201 into abutment on the machine body 201 by the swing movement of the throttle lever 203, thereby stopping rotation of the handle 202.

The throttle lock lever 204 is released from the throttle lever 203 by moving as indicated by an arrow c1. The throttle lever 203 is then gripped to move as indicated by an arrow c2, thereby pushing the locking member 205 out as indicated by an arrow c3 so as to lock the handle 202 to the machine body 201.

As for the power working machine 200, however, it is troublesome to rotate and lock the handle 202 because, in order that the handle 202 rotated relative to the machine body 201 through a predetermined angle is locked to the machine body 201, the throttle lock lever 204 is released from the throttle lever 203 and thereafter the throttle lever 203 is gripped to press the locking member 205 towards the machine body 201.

As for the power working machine 200, moreover, it is impossible to perform the following two operations simultaneously: (1) locking the handle 202 to prevent the rotation of the handle 202; and (2) releasing the throttle lock lever 204 from the throttle lever 203. Thus, the power working machine 200 presents a problem that such a connection component as a centrifugal clutch would provide such a timing of operation as to drive cutting blades (not shown) before the handle 202 is locked to the machine body 201.

There is a demand for a power working machine including a handle rotatable through a simple operation and taking such measures against erroneous operation of a throttle lever as to, for example, prevent operation of the throttle lever during rotational operation of the handle and to prevent the rotational operation of the handle during the operation of the throttle lever.

SUMMARY OF THE INVENTION

An object of the present invention is to provide a power working machine including a handle easily rotatable without requiring any troublesome operation and a rotatable throttle lever for eliminating any unreliableness lying in operation of the throttle lever or the rotational operation of the handle so as to prevent any erroneous operations of the throttle lever.

According to one aspect of the present invention, there is provided a power working machine comprising: a machine body; a prime mover provided on a central part of the machine body; working units provided on a front part of the machine body and driven by operation of the prime mover; a handle rotatably attached to a rear part of the machine body; a throttle lever provided in the handle in such a manner as to swing between a nonworking position and a working position for adjusting an output power of the prime mover; the handle including a locking mechanism lockable to a shaft section of the machine body at a predetermined angle, the locking mechanism being unlocked from the shaft section by moving towards a rear part of the handle; and an unlocking member for surrounding the throttle lever to render the throttle lever inoperable when the locking mechanism is unlocked from the shaft 15 section.

With this arrangement, the throttle lever is inoperable when the handle undergoes the rotational operation. Thus, the handle can be rotated separately from the operation of the throttle lever. Namely, the handle can be rotated easily and hence provides an improved operability thereof. Further, there is no possibility that the throttle lever is erroneously operated during the rotational operation of the handle.

In a preferred form of the present invention, the unlocking member is attached to the handle in such a manner as to slide in a front-and-rear direction of the handle. Thus, the throttle lever is covered just by the rearward slide movement of the unlocking member. Further, erroneous operation of the throttle lever can be easily prevented during the rotational operation of the handle. As a result, the operability of the handle can be improved.

Desirably, the unlocking member has operation portions operable from left and right sides of the handle. Therefore, the unlocking member can be operated from either one of the left and right sides of the handle. This results in increased convenience for the rotational operation of the handle.

Desirably, the locking mechanism is unlocked from the shaft section by a slide movement of the unlocking member towards the rear part of the handle. Accordingly, the locking mechanism can be readily unlocked from the shaft section by the operation of the unlocking member.

Desirably, the shaft section has on an outer periphery thereof a plurality of groove portions extending longitudinally of an axis of the shaft section and being spaced predetermined angles apart, the locking mechanism having a projection portion to be locked to and unlocked from any one of the groove portions. Further, the locking mechanism is urged by a spring in such a direction that the projection portion is locked to the one of the groove portions. Therefore, such a locking mechanism is made simple in structure.

BRIEF DESCRIPTION OF THE DRAWINGS

A certain preferred embodiment of the present invention will hereinafter be described in detail, by way of example only, with reference to the accompanying drawings, in which.

DETAILED DESCRIPTION OF THE PREFERRED EMBODIMENT

A hedge trimmer for performing a trimming operation on a hedge, construed as an exemplary portable power working machine in the preferred embodiment, will be hereinbelow discussed.

Figure 1:
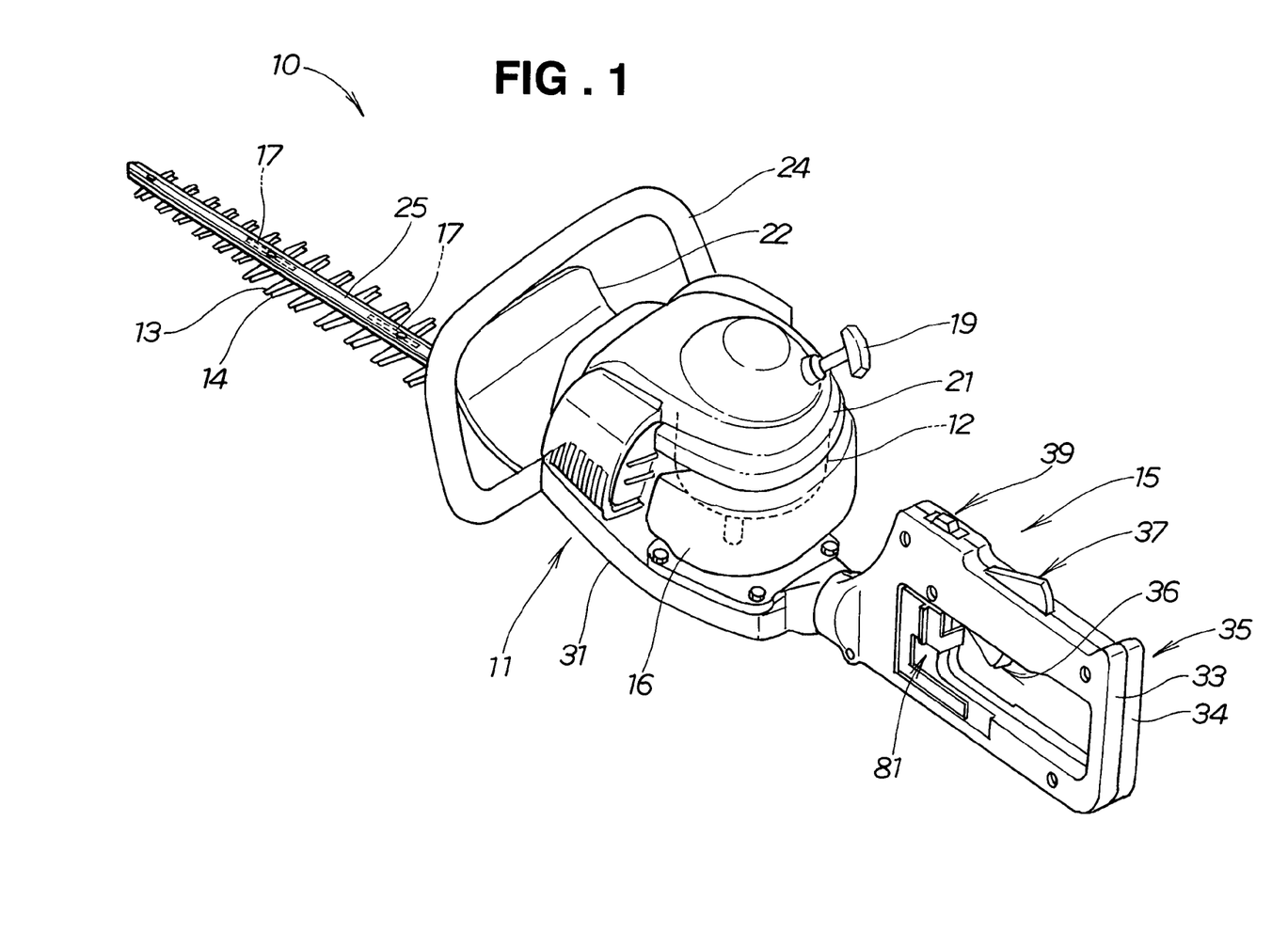
FIG. 1 is a perspective view of a power working machine according to the present invention.
Figure 2:
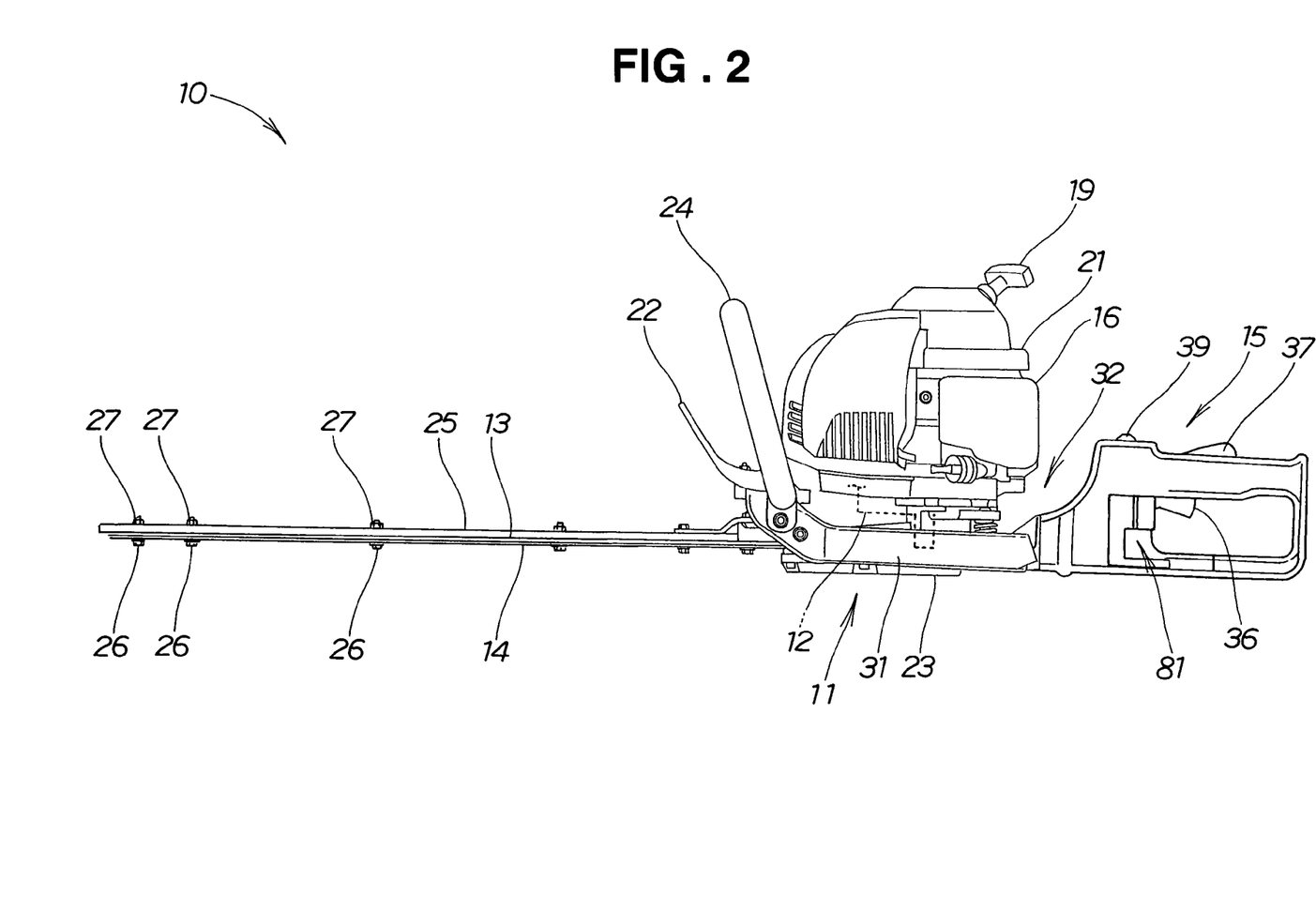
FIG. 2 is a side elevation view of the power working machine shown in FIG. 1.

Referring to FIG. 1 and FIG. 2, a hedge trimmer 10 includes a machine body 11 and a prime mover 12 such as an engine carried on the machine body 11. The hedge trimmer 10 is arranged so that a rotational speed of the primer mover 12 is reduced and the rotation of reduced speed is converted into a reciprocating movement to be transmitted to upper and lower cutting blades 13, 14 each acting as a working unit for trimming a hedge. The hedge trimmer 10 includes a handle 15 rotatable in correspondence to an operator's posture changed, for example, when a location on which trimming operation is performed is changed from an upper surface of the hedge to a side surface of the hedge during the trimming operation.

A fuel to be supplied to the prime mover 12 is held in a fuel tank 16. The prime mover 12 is started by a recoil starter knob 19 being pulled. The prime mover 12 is surrounded by a prime mover cover 21. The hedge trimmer 10 includes a protector 22 disposed forward of the prime mover 12 for preventing scattering of trimmed branches or leaves produced during the trimming operation.

The hedge trimmer 10 includes a cover member 23 disposed at a bottom of the machine body 11 for sliding over the hedge to advance the trimming operation. The handle 15 is rotatably attached to a rear part of the machine body 11 and is to be gripped by an operator's one hand for supporting the machine body 11 during the trimming operation. The hedge trimmer 10 includes a nonrotatable, closedloop shaped stationary handle 24 disposed forward of the machine body 11.

The stationary handle 24 is to be gripped by the operator's other hand for supporting the machine body 11 during the trimming operation.

The upper and lower cutting blades 13, 14 are supported by a support frame 25. The support frame 25 extends forward from the machine body 11. The upper and lower cutting blades 13, 14 are attached to the support frame 25 by plural bolts 26 extending through plural elongated holes 17, 17, formed in the blades 13, 14, and nuts 27 threadedly engaging the bolts 26, such that the upper and lower cutting blades 13, 14 slide relative to each other along the support frame 25.

The machine body 11 includes a case body 31 incorporating therein a reduction mechanism for reducing a rotational speed of the prime mover 12 and a conversion mechanism for converting the rotation of reduced speed into a reciprocating movement. The machine body 11 includes a shaft section 32 provided to the case body 31. The handle 15 is rotatably attached to the shaft section 32.

Figure 3:
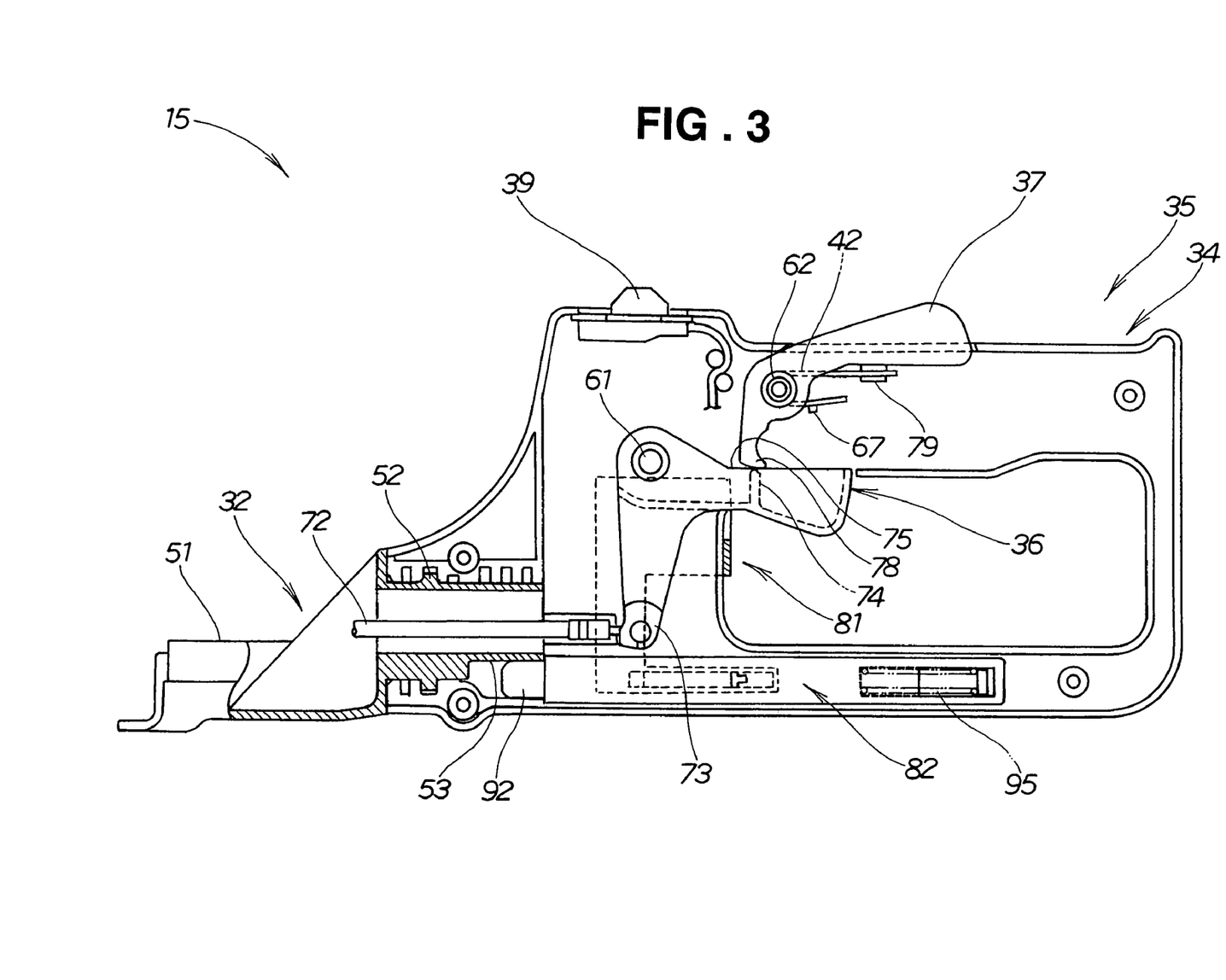
FIG. 3 is a view showing a relation between a machine body and a handle of the power working machine shown in FIG. 2, showing partly in cross-section the machine body.

FIG. 3 shows the right one of left and right handle halves 33, 34 shown in FIG. 1.

The handle 15 includes a handle body 35 having the left and right handle halves 33, 34 (FIG. 1) assembled together. A throttle lever 36 for adjusting an output power from the prime mover 12 (FIG. 2) is pivotably attached to the handle body 35. A throttle lock lever 37 for locking the throttle lever 36 in a locked state is pivotably or swingably attached to the handle body 35.

A locking mechanism 82 provided in the handle body 35 is arranged to be locked to the shaft section 32 of the machine body 11 at a predetermined angle. The locking mechanism 82 can be unlocked from the shaft section 32 by movement of an unlocking member 81 rearward of the handle 15. With the locking mechanism 82 unlocked from the shaft section 32, the unlocking member 81 partly covers opposite sides of the throttle lever 36 to render the throttle lever 36 inoperable. In this manner, the locking mechanism 82 is switchable between locking and unlocking states to lock and unlock the handle 15 in different angular positions. A starter switch 39 is provided for activating/deactivating the prime mover 12.

Figure 4:
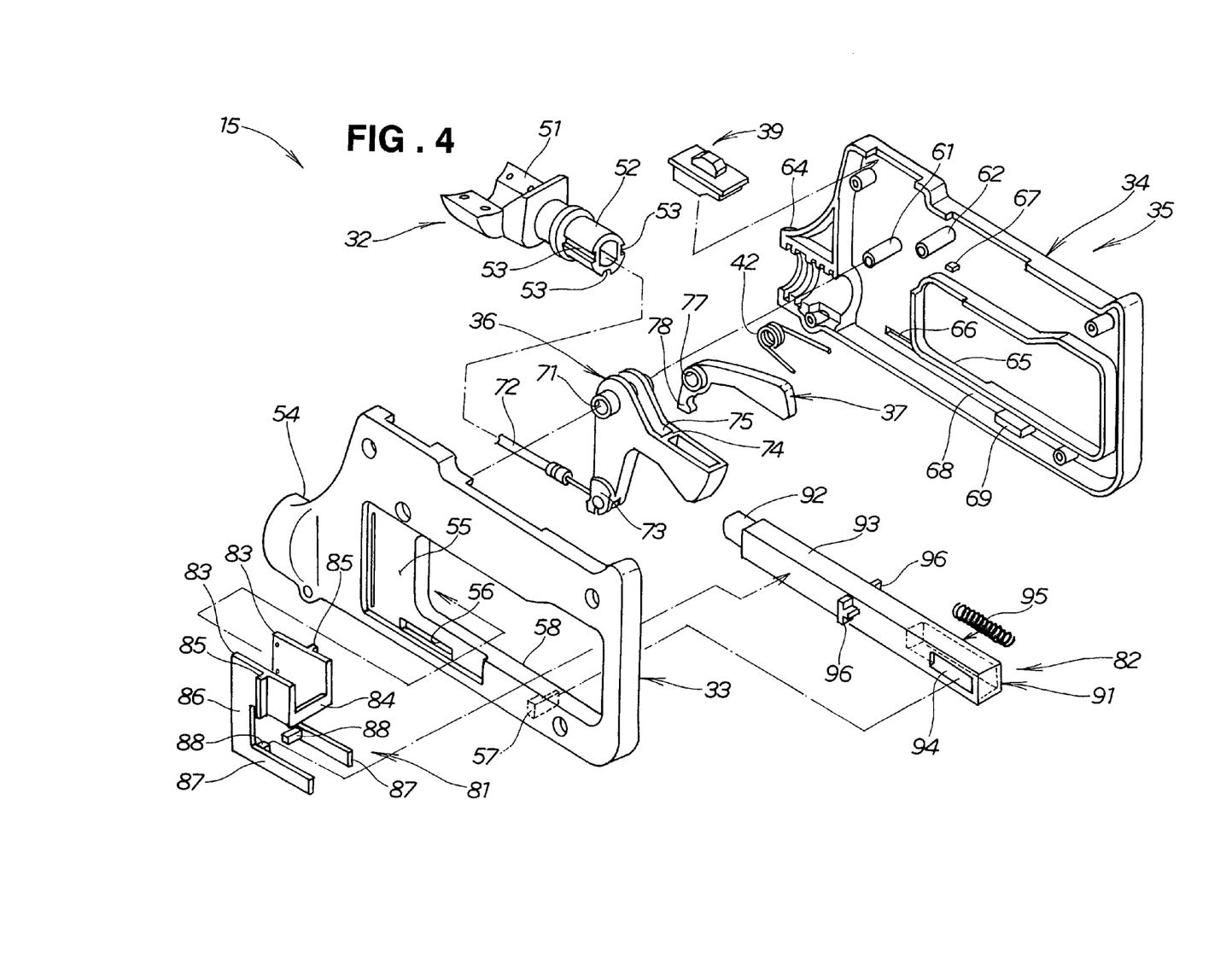
FIG. 4 is an exploded perspective view of the handle shown in FIG. 1.

Referring to FIG. 4 showing in perspective the handle 15 in an exploded state, the shaft section 32 includes an attachment portion 51 to be attached to the case body 31 (FIG. 2), a tubular portion 52 by which the handle body 35 is to be rotatably or turnably supported, and a plurality of groove portions 53 formed on an outer peripheral surface of the tubular portion 52 and extending longitudinally of an axis of the tubular portion 52. The plural groove portions 53 lock the handle body 35 at a predetermined rotational angle or angular position.

The left handle half 33 includes a left fitting portion 54 to be fitted with the shaft section 32, a slide portion 55 by which the unlocking member 81 is supported in such a manner as to slide in a front-and-rear direction of the handle 15, an elongated hole 56 formed in the slide portion 55, a retention rib (a retention portion) 57 for retaining the locking mechanism 82, and a guide portion 58 for guiding a slide movement of the locking mechanism 82.

The right handle half 34 includes a throttle lever boss 61 to which the throttle lever 36 is pivotably attached, a stationary lever boss 62 to which the throttle lock lever 37 is swingably attached, a right fitting portion 64 to be fitted with the shaft section 32, a slide portion 65 by which the unlocking member 81 is slidably supported, an elongated hole 66 formed in the slide portion 65, a spring catching portion 67 for catching or supporting one end of a torsion spring 42, a guide portion 68 for guiding the slide movement of the locking mechanism 82, and a reinforcement rib 69 for preventing a return spring 95 from coming out of the locking mechanism 82.

The throttle lever 36 includes a shaft hole 71 into which the throttle lever boss 61 is to be fitted, a support portion 73 for supporting a throttle wire 72, an abutment portion 74 on which the throttle lock lever 37 is to abut, and an escape portion 75 into which the throttle lock lever 37 is to escape.

The throttle lock lever 37 includes a hole 77 into which the lock lever boss 62 is to be fitted, an action portion 78 to abut on the abutment portion 74 or escape into the escape portion 75 of the throttle lever 36, and a spring support portion 79 (FIG. 3) for supporting the other end of the torsion spring 42.

The unlocking member 81 includes cover portions 83, 83 for covering opposite sides of the throttle lever 36, an interconnection portion 84 interconnecting the cover portions 83, 83, operation portions 85, 85 that extend outwardly from the cover portions 83, 83, respectively, for engagement with the operator's fingers, vertical portions 86, 86 (only one shown) extending downward from the cover portions 83, 83, respectively, slide rail portions 87, 87 horizontally extending from the vertical portions 86, 86 for sliding relative to the handle body 35, and engagement portions 88,88 formed on the slide rail portions 87, 87 for engagement with the locking mechanism 82.

Figure 5:
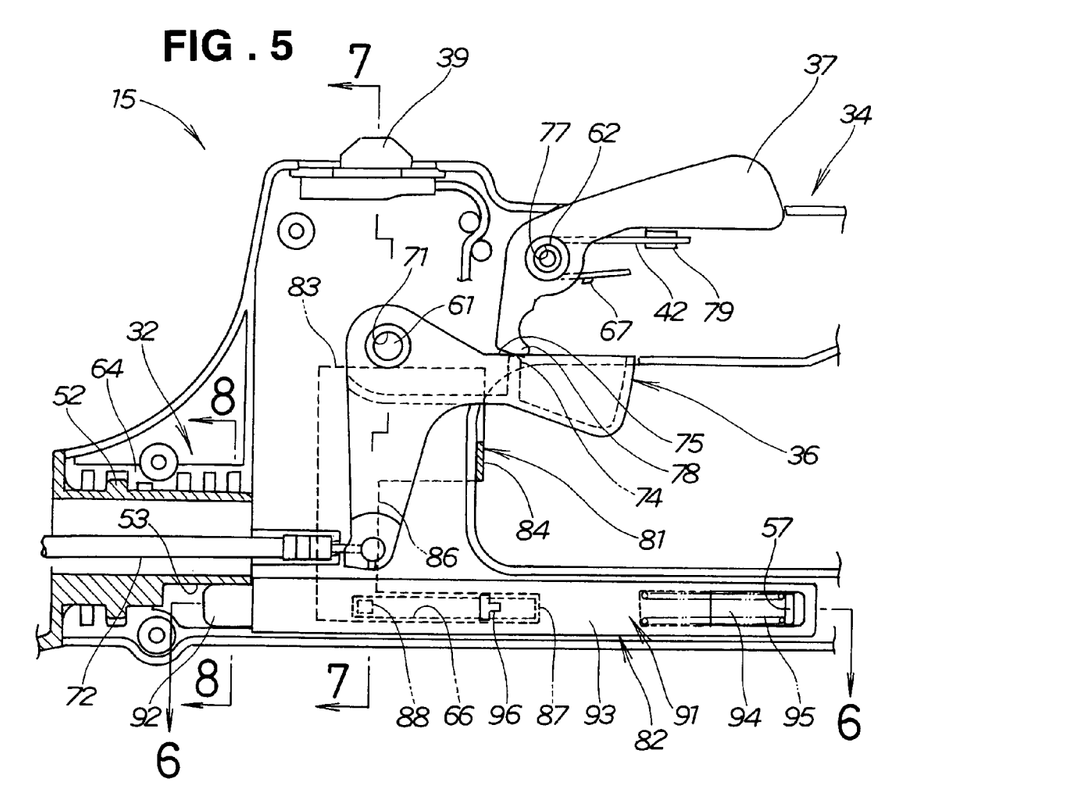
FIG. 5 is a view showing a locking mechanism and an unlocking member provided in the handle according to the present invention, showing partly in cross-section the unlocking member.
Figure 6:
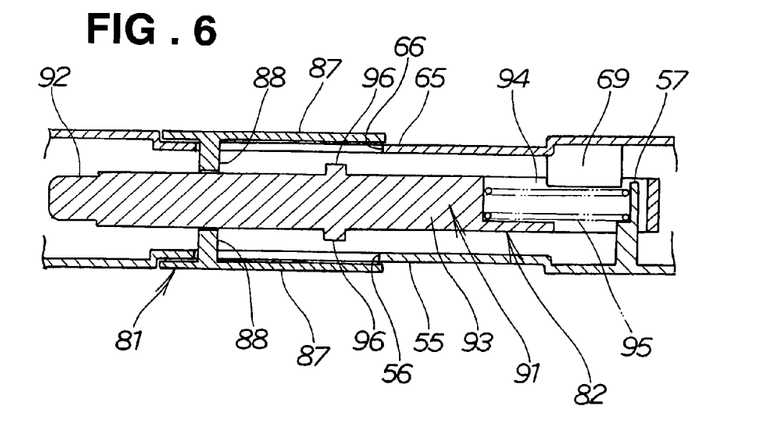
FIG. 6 is a cross-sectional view taken along line 6-6 of FIG. 5, showing in cross-section the locking mechanism and the unlocking member.

As shown in FIG. 5 and FIG. 6, the locking mechanism 82 includes a locking lever 91, and a spring 95 for urging the locking lever 91 in such a direction as to bring a projection portion 92 of the locking lever 91 into locking engagement with the groove portion 53 of the shaft section 32. By virtue of the locking mechanism 82, the handle 15 is locked to the shaft section 32 of the machine body 11 (FIG. 2) at a predetermined rotational angle.

The locking lever 91 includes the projection portion 92 to be locked to and unlocked from one of the plural groove portions 53 formed on the shaft section 32, an extension portion 93 extending from the projection portion 92 rearward of the handle 15, and a spring retention portion 94 formed in a rear part of the extension portion 93 for accommodating and retaining the urging spring 95 therein, and lugs 96, 96 formed on the extension portion 93 for engagement with the engagement portions 88, 88 of the unlocking member 81.

The urging spring 95 is accommodated within a space defined between a front end of the spring retention portion 94 and the retention rib 57.

By moving the unlocking member 81 rearward of the handle 15 against an urging force of the urging spring 95, the unlocking member 81 brings the projection portion 92 out of the locking engagement with the groove portion 53 of the shaft section 32 to thereby render the handle 15 rotatable or turnable relative to the machine body 11 (FIG. 2). By returning (unhanding) of the unlocking member 81, the projection portion 92 is automatically lockable to one of the groove portions 53 which corresponds to an angular position of the handle 15 rotated through a predetermined angle.

Figure 7:
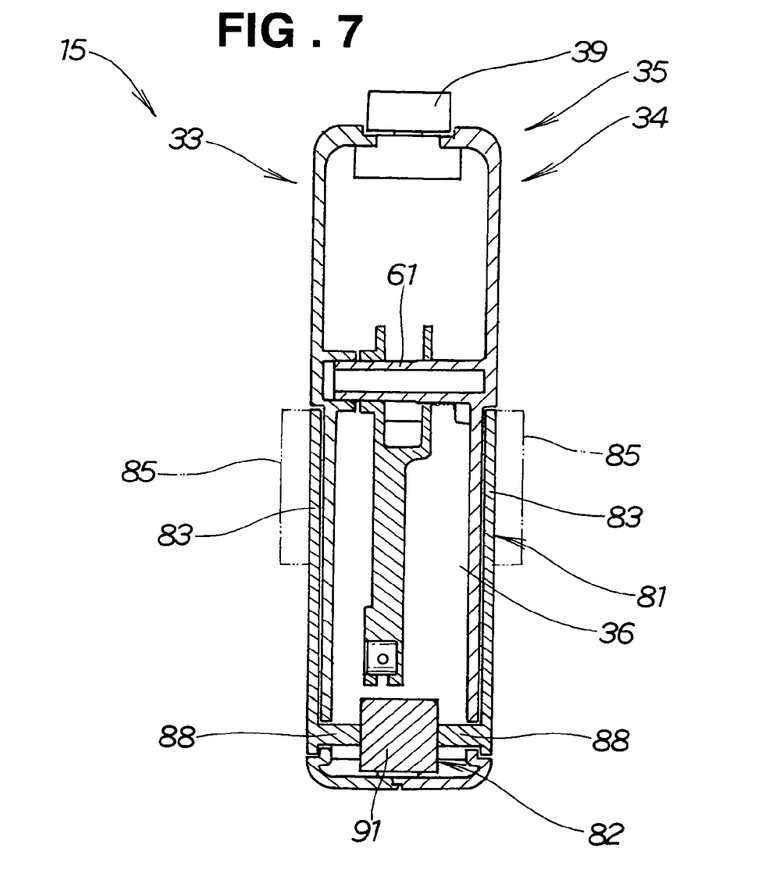
FIG. 7 is a cross-sectional view taken along line 7-7 of FIG. 5.

FIG. 7 shows in cross-section the unlocking member 81. The unlocking member 81 unlocks the locking mechanism 82 by moving rearward of the handle 15, as discussed above, whereupon the unlocking member 81 covers both sides of the throttle lever 36 to render the throttle lever 36 inoperable. That is, the unlocking member 81 inhibits the rotational operation of the handle 15 during the trimming operation of the hedge trimmer.

Figure 8:
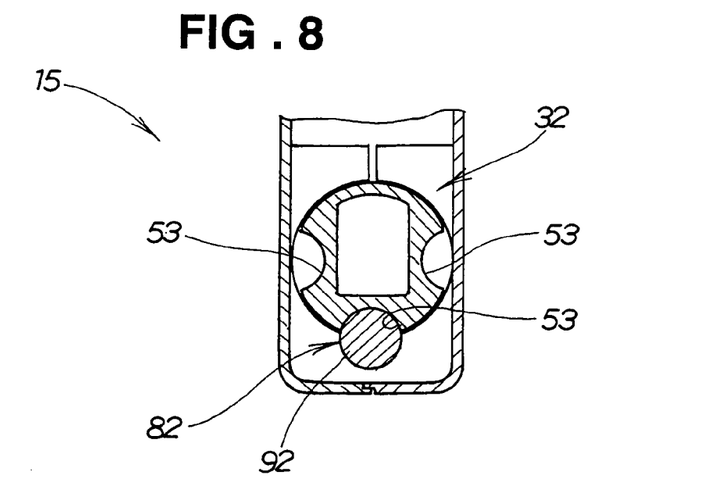
FIG. 8 is a cross-sectional view taken along line 8-8 of FIG. 5, showing a relation between the a shaft section of the machine body and a projection portion of the locking mechanism.

FIG. 8 shows the projection portion 92 of the locking mechanism 82 locked to one of the plural groove portions 53 formed on the shaft section 32 of the case body 31 (FIG. 2).

The plural groove portions 53 are formed on left, right and lower portions of the shaft section 32 and are spaced 90 degrees apart. With this arrangement, the handle 15 can be turned leftward or rightward into a horizontal position or be disposed in an upright position relative to the machine body 11 (FIG. 1) for providing an improved usefulness of the hedge trimmer 10 (FIG. 1).

Figure 9:
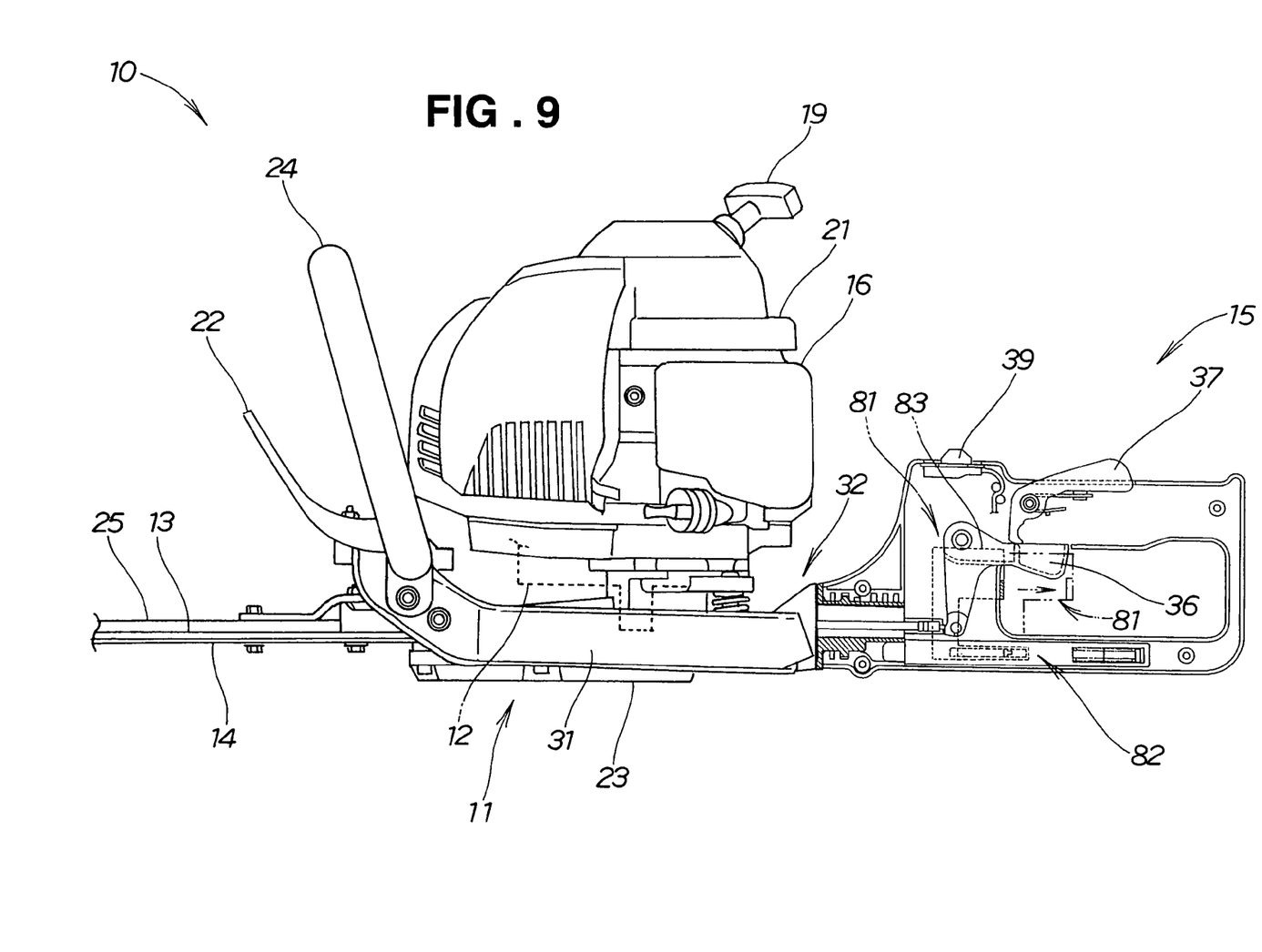
FIG. 9 is a view showing, on an enlarged scale, part of the power working machine shown in FIG. 2.

Reference is made to FIG. 9. The hedge trimmer 10 includes the upper and lower cutting blades 13, 14 driven by the prime mover 12 attached to the machine body 11. The handle 15 is rotatably attached to the machine body 11 through the locking mechanism 82. The throttle lever 36 is provided in the handle 15 for adjusting an output power of the prime mover 12.

The handle 15 includes the locking mechanism 82 to be locked to and unlocked from the shaft section 32 of the machine body 11. The handle 15 is made rotatable relative to the machine body 11 when the locking mechanism 82 is unlocked from the shaft section 32. The slide movement of the unlocking member 81 rearward of the handle 15, as shown by a double dot-and-dash line, releases the locking mechanism 82 from the locking engagement with the shaft section 32. Simultaneously with the releasing of the locking mechanism 82 from the locking engagement with the shaft section 32, the unlocking member 81 covers the throttle lever 36 in such a manner that the throttle lever 36 is made inoperable. To enable the cover portions 83, 83 of the unlocking member 81 to at least partly cover the throttle lever 36 before unlocking the locking mechanism 83 from the shaft section 32, the unlocking member 81 moves rearwardly a short, given distance independently of movement of the locking mechanism, and then further rearward movement of the unlocking member 81 releases the locking mechanism 82 from the shaft section 32 due to engagement of the engagement portions 88, 88 with the lugs 92, 92. Therefore, an operator can have an improved feeling when performing a rotational operation on the handle 15.

The unlocking member 81 includes the operation portions 85, 85 (FIG. 4) operable from left and right sides of the handle 15. By virtue of the operation portions 85, 85, the operator can operate the unlocking member 81 from either of the left and right sides of the handle 15 for performing the rotational operation on the handle 15 with enhanced convenience.

Discussion will be made as to operations of the throttle lever 36, the throttle lock lever 37, the unlocking member 81 and the locking mechanism 82 with reference to FIG. 10A through FIG. 10D.

Figure 10A:
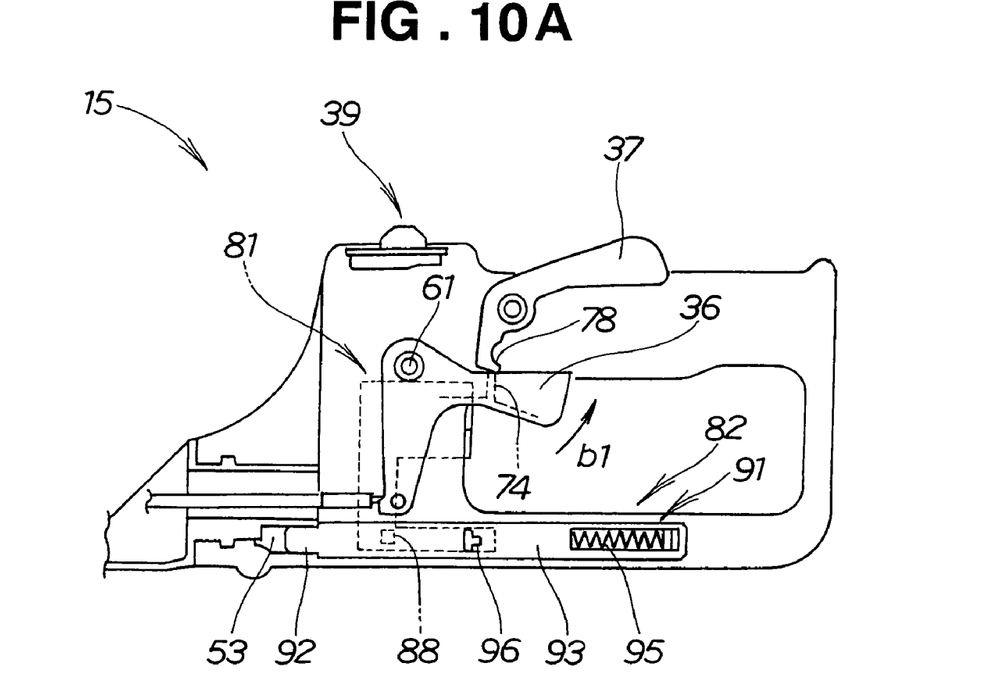
FIG. 10A through FIG. 10D are views showing a relation between a throttle lever, a throttle lock lever, the locking mechanism and the unlocking member.

FIG. 10A shows the throttle lever 36 in a locked state in which the action portion 78 of the throttle lock lever 37 abuts on the abutment portion 74 of the throttle lever 36. When in the locked state, namely, the throttle lever 36 is inoperable to turn on the throttle lever boss 61 counterclockwise as indicated by an arrow b1.

Figure 10B:
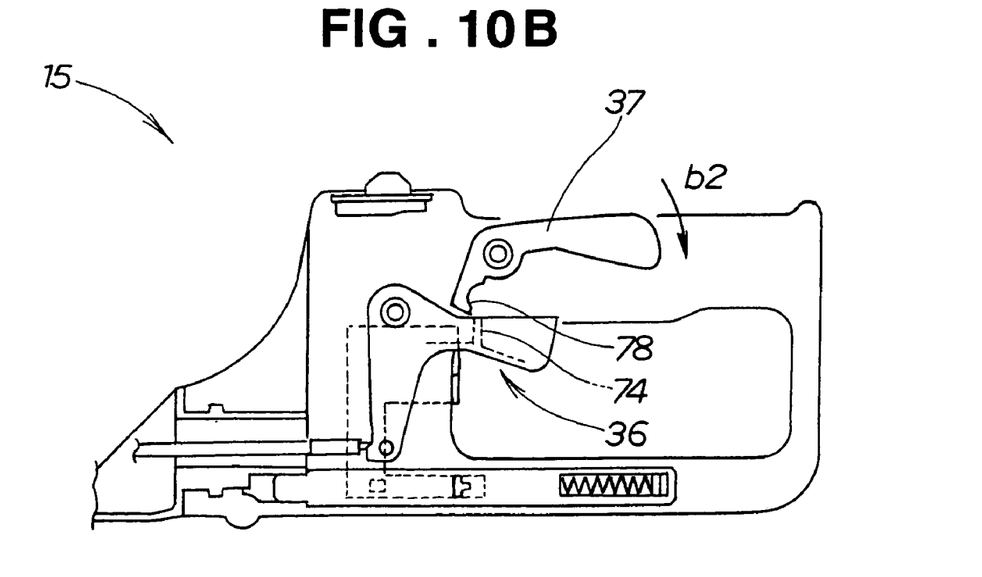

As shown in FIG. 10B, when the throttle lock lever 37 is turned in a clockwise direction as indicated by an arrow b2, the action portion 78 of the throttle lock lever 37 moves away from the abutment portion 74 of the throttle lever 36. By this movement of the action portion 78 of the throttle lock lever 37 away from the abutment portion 74, the throttle lever 36 is unlocked from the throttle lock lever 37 into an operable state.

Figure 10C:
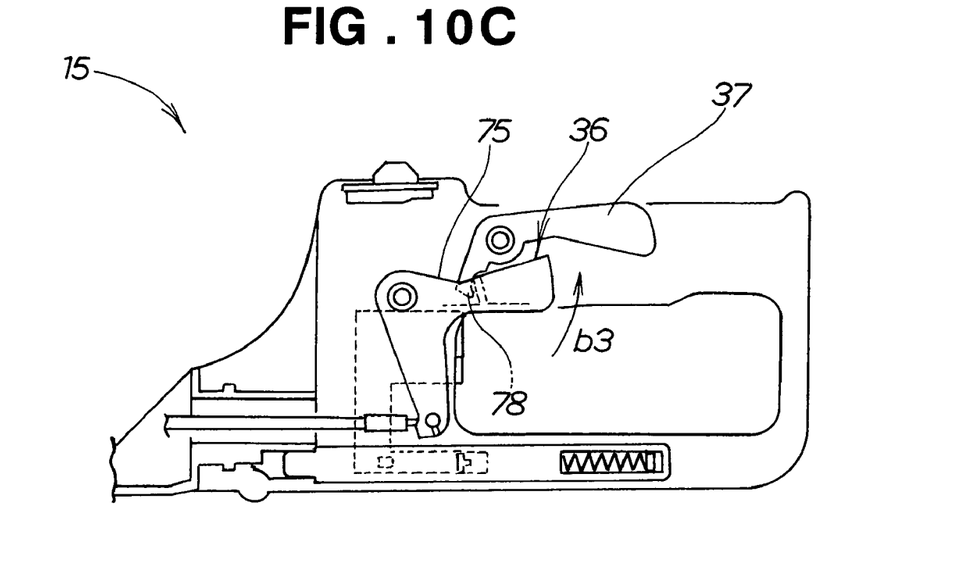

As shown in FIG. 10C, turning movement of the throttle lever 36 in a direction of an arrow b3 operates the upper and lower cutting blades 13, 14 shown in FIG. 2 for performing the trimming operation. By the turning movement of the throttle lever 36 in the direction of the arrow b3, the action portion 78 of the throttle lock lever 37 escapes into the escape portion 75 of the throttle lever 36.

Figure 10D:
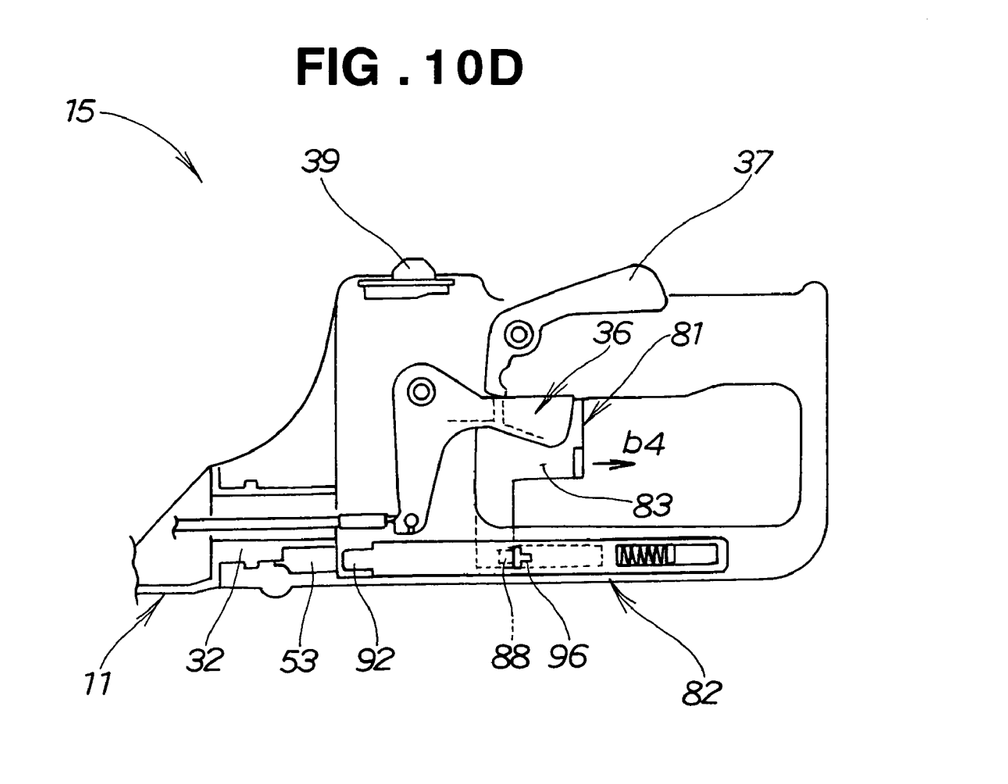

When the unlocking member 81 is slid or displaced linearly towards a rear part of the handle 15, as shown by an arrow b4 of FIG. 10D, with the throttle lever 36 locked by the throttle lock lever 37 as explained with reference to FIG. 10A, the engagement portions 88, 88 of the unlocking member 81 come into engagement with the lugs 96 of the locking mechanism 82 to move the locking mechanism 82 towards the rear part of the handle 15 thereby switching the locking mechanism to the unlocking state in which the projection portion 92 of the locking mechanism 82 is released from locking engagement with the groove portion 53 formed on the shaft section 32 of the machine body 11. Thus, the handle 15 is made rotatable relative to the shaft section 32 of the machine body 11. With the projection portion 92 of the locking mechanism released from the locking engagement with the groove portion 53, the cover portions 83 of the unlocking member 81 having been slid towards the rear part of the handle 15 as discussed above cover the throttle lever 36 and block access thereto by the operator so as to inhibit operation of the throttle lever 36. Therefore, there is no possibility that the throttle lever 36 is erroneously operated during the turning operation of the handle 15.

FIG. 11A through FIG. 11F show various rotational set positions of the handle 15 of the hedge trimmer in the preferred embodiment of the present invention. In these figures, the plural groove portions 53 (the three groove portions 53) of the shaft section 32 are designated to be a left groove portion 53L, a central groove portion 53C and a right groove portion 53R.

Figure 11A:
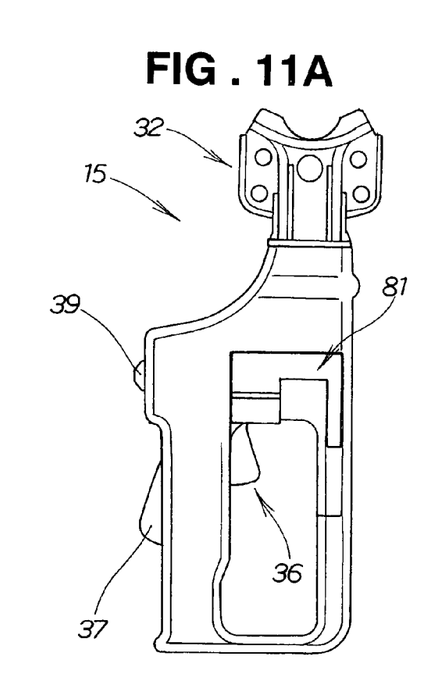
FIG. 11A through FIG. 11F are views showing different rotational set positions of the handle of the power working machine according to the present invention.
Figure 11B:
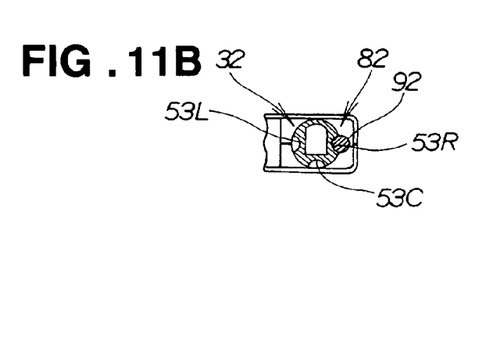

FIG. 11A shows the handle 15 turned leftward through 90 degrees relative to the machine body 11 (FIG. 1). This leftward turned position of the handle 15 is suitable, for example, for trimming a lower part of a side surface of a hedge or the like. When the handle 15 is in the position shown in FIG. 11A, the projection portion 92 of the locking mechanism 82 is locked to the right groove portion 53R, as shown in FIG. 11B.

Figure 11C:
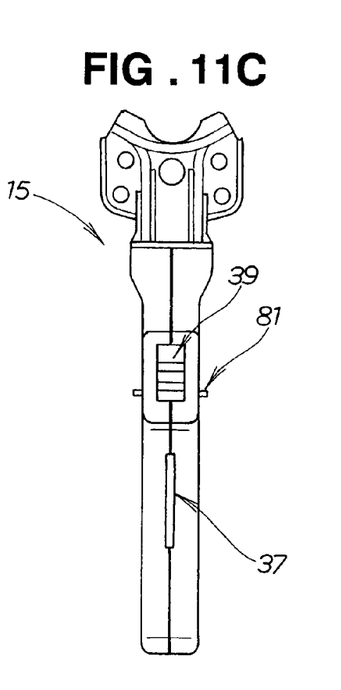
Figure 11D:
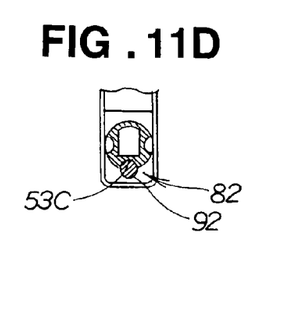

FIG. 11C shows the handle 15 set in a regular position. This regular position of the handle 15 is suitable, for example, for trimming an upper surface of the hedge or the like. When the handle 15 is in the position of FIG. 11C, the projection portion 92 of the locking mechanism 82 is locked to the central groove portion 53C, as shown in FIG. 11D.

Figure 11E:
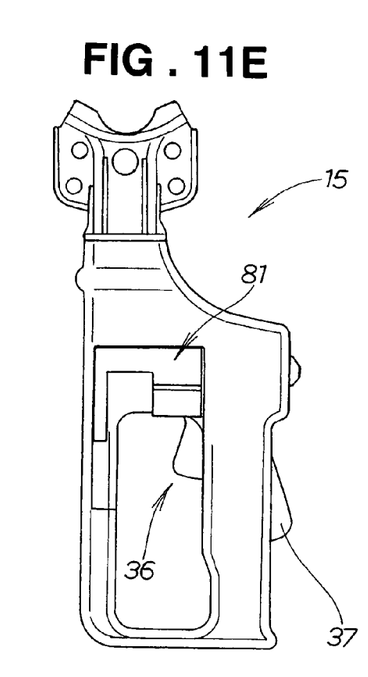
Figure 11F:
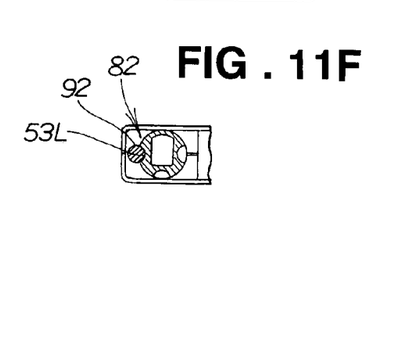

FIG. 11E shows the handle 15 turned rightward through 90 degrees relative to the machine body 11 (FIG. 1). This rightward turned position of the handle 15 is suitable, for example, for trimming an upper part of the side surface of the hedge or the like. When the handle 15 is in the position of FIG. 11E, the projection portion 92 of the locking mechanism 82 is locked the left groove portion 53L, as shown in FIG. 11F.

Although each of the upper and lower cutting blades 13, 14 is driven in the abovementioned preferred embodiment, either the upper cutting blade 13 or the lower cutting blade 14 may undergo a reciprocating movement. Further, each of the upper and lower cutting blades 13, 14 has its teeth provided on both left and right sides thereof, as shown in FIG. 1, for providing a cutting function to the left and right sides of each cutting blade, however, each of the upper and lower cutting blades may have teeth provided on one of the left and right sides for serving a cutting function to the one side of the cutting blade.

Although the right handle half 34 has the throttle lever boss 61 and the throttle lock lever boss 62 provided thereon as shown in FIG. 4 in the preferred embodiment discussed above, the bosses 61, 62 may be provided on the left handle half 33 or otherwise both of the left and right handle halves 33, 34.

The operation portions 85, 85 of the unlocking member 81 are in the form of projections operable from the left and right sides of the handle body 35, as shown in FIG. 4 in the above preferred embodiment, however, they may take the form of recesses for engagement with the operator's fingers.

Although the unlocking member 81 is manually returned to its initial position as shown in FIG. 6 in the above preferred embodiment, the unlocking member 81 may be equipped with a resilient means (for example, a compression spring or an extension spring) for returning the unlocking member 81 to the initial position.

Obviously, various minor changes and modifications of the present invention are possible in the light of the above teaching. It is therefore to be understood that within the scope of the appended claims the invention may be practiced otherwise than as specifically described.

What is claimed is:

1. A power working machine comprising:
a machine body;
a prime mover provided on the machine body;
a working unit provided on a front part of the machine body and driven by operation of the prime mover;
a handle rotatably attached to a rear part of the machine body;
a throttle lever provided on the handle in such a manner as to swing between a non-working position and a working position for adjusting an output power of the prime mover;
a lock lever provided on the handle and pivotal into and out of engagement with the throttle lever to releasably lock the throttle lever in the non-working position;
a locking mechanism disposed on the handle and lockable to a shaft section of the machine body at a predetermined angle, the locking mechanism being unlocked from the shaft section by slide movement towards a rear part of the handle; and
an unlocking member that partly covers at least opposite sides of the throttle lever to render the throttle lever inoperable when the locking mechanism is unlocked from the shaft section, the unlocking member having cover portions that cover the opposite sides of the throttle lever, operation portions provided on respective ones of the cover portions and operable from left and right sides of the handle, and engagement portions that engage with lugs on the locking mechanism to effect rearward sliding movement of the locking mechanism in response to rearward sliding movement of the unlocking member.

2. A power working machine according to claim 1, wherein the unlocking member is attached to the handle in such a manner as to slide in a front-and-rear direction of the handle.

3. A power working machine according to claim 1, wherein the shaft section has on an outer periphery thereof a plurality of groove portions extending longitudinally of an axis of the shaft section and being spaced predetermined angles apart, the locking mechanism having a projection portion to be locked to and unlocked from any one of the groove portions.

4. A power working machine according to claim 3, wherein the locking mechanism is urged by a spring in such a direction that the projection portion is locked to the one of the groove portions.

5. A power working machine according to claim 1, wherein the unlocking member is slidably attached to the handle in such a manner as to slide linearly in a front-and-rear direction of the handle.

* * * * *